(12) United States Patent
Wagner et al.

(10) Patent No.: US 8,140,226 B2
(45) Date of Patent: Mar. 20, 2012

(54) SECURITY SYSTEM AND A METHOD TO DERIVE A SECURITY SIGNAL

(75) Inventors: Daniel Wagner, Weinstadt (DE); Frank Linsenmaier, Weinstadt (DE)

(73) Assignee: SMR Patents S.a.r.l., Luxembourg (LU)

( * ) Notice: Subject to any disclaimer, the term of this patent is extended or adjusted under 35 U.S.C. 154(b) by 454 days.

(21) Appl. No.: 12/335,007

(22) Filed: Dec. 15, 2008

(65) Prior Publication Data
US 2009/0157264 A1 Jun. 18, 2009

(30) Foreign Application Priority Data
Dec. 14, 2007 (EP) ..................................... 07123224

(51) Int. Cl.
*B60R 21/16* (2006.01)
(52) U.S. Cl. ............................ 701/45; 280/735; 180/274
(58) Field of Classification Search .................. 280/735; 180/274; 701/45
See application file for complete search history.

(56) References Cited

U.S. PATENT DOCUMENTS

| | | | |
|---|---|---|---|
| 6,313,739 B1 * | 11/2001 | Roth et al. ............... | 340/426.26 |
| 6,343,810 B1 * | 2/2002 | Breed ....................... | 280/730.2 |
| 6,757,611 B1 * | 6/2004 | Rao et al. ................. | 701/301 |
| 6,950,014 B2 * | 9/2005 | Rao et al. ................. | 340/438 |
| 7,260,461 B2 * | 8/2007 | Rao et al. ................. | 701/45 |
| 7,359,782 B2 * | 4/2008 | Breed ....................... | 701/45 |
| 7,440,830 B2 * | 10/2008 | Isaji et al. ............... | 701/45 |
| 7,453,374 B2 * | 11/2008 | Koike et al. ............... | 340/903 |
| 7,616,101 B2 * | 11/2009 | Kuttenberger et al. ....... | 340/435 |
| 7,630,806 B2 * | 12/2009 | Breed ....................... | 701/45 |
| 7,688,186 B2 * | 3/2010 | Kataoka et al. ............. | 340/435 |
| 7,765,065 B2 * | 7/2010 | Stiller ....................... | 701/301 |

FOREIGN PATENT DOCUMENTS

| | | |
|---|---|---|
| DE | 102004046101 A1 | 9/2004 |
| EP | 1158473 A1 | 11/2001 |
| EP | 1837805 A1 | 9/2007 |
| WO | 0243982 A1 | 6/2002 |

OTHER PUBLICATIONS

European Search Report for application 07123224.3 dated May 26, 2008.

* cited by examiner

*Primary Examiner* — Toan To
(74) *Attorney, Agent, or Firm* — Reising Ethington P.C.

(57) ABSTRACT

This invention relates to a security system for vehicles that have a side-looking pre-crash sensor for anticipating impact by a closing object, such as another motor vehicle, from a direction that is non-parallel to the direction of travel of the host vehicle. Such a system employs optical recognition for acquiring closing objects and for easing classification of the objects. The invention relates further to a method to derive a signal used for example to activate a side air back or to be used and further security systems of a vehicle.

9 Claims, 5 Drawing Sheets

SECURITY SYSTEM AND A METHOD TO DERIVE A SECURITY SIGNAL

FIELD OF THE INVENTION

The invention is based on a priority patent application EP 07123224.3 which is hereby incorporated by reference.

This invention relates to a security system for vehicles that have a side-looking pre-crash sensor for anticipating impact by a closing object, such as another motor vehicle, from a direction that is non-parallel to the direction of travel of the host vehicle. Such a system employs optical recognition for acquiring closing objects and for easing classification of the objects. In addition the invention can be applied also in a situation in which the vehicle itself impacts a fixed or moving obstacle.

The invention relates further to a method to derive a signal used for example to activate a side air back or to be used and further security systems of a vehicle.

BACKGROUND OF INVENTION

Know prior art discloses various on-board radar systems for detecting objects in the vicinity of a travelling host vehicle. For example, U.S. Pat. No. 5,767,803 discloses a forward-looking system that is said to be capable of distinguishing an on-coming vehicle that is in the same lane as the host vehicle from an on-coming vehicle that is not. U.S. Pat. No. 6,522,287 discloses a pre crash sensor used to activate a side air back in case of an expected impact of a vehicle. The disclosed solution comprises sensors using an aperture which is aimed laterally when the vehicle is travelling in forward direction.

The proposed solution of an actuated sensor optic has the disadvantage that this can be only done for a short time period requesting a actuation in forward direction. The mechanical parts of such an adaptive solution are expensive and arise problems for the data reliability. For optical sensors this solution will not work. The solution is tolerant versus the objects detected which mean that a security signal could be produced by an artefact, because the detected objects are not classified.

The U.S. Pat. No. 6,907,335 discloses a radar sensor based system in which a pre crash function is realized. The severity of an accident caused by an impact is determined by the type and the velocity of obstacles. According the U.S. Pat. No. 6,907,335 an obstacle is classified on the basis of pre-crash sensor signals by determining the obstacle velocity, acceleration, and acceleration change. Radar sensor signals allow the detection of objects, but for a classification several assumptions are necessary to avoid failure alarm for example when a pedestrian is detected.

SUMMARY OF THE INVENTION

The invention is based on the fact that a radar sensor cannot be as successful to detect an object and to classify it as a video sensor. The video frame information shows a complete picture of vehicle environment independent from velocity of the vehicle.

Whether a collision between a host vehicle and a closing object will occur depends on many factors including the range, the velocity, and the travel direction of the closing object and the velocity and the travel direction of the host vehicle, subject to any evasive action that may be taken. If a host vehicle has a side-looking video sensor aimed in a direction that is non-parallel to the longitudinal axis of the vehicle, any approaching object can be detected.

Accuracy of such information may be important in setting a deployment threshold for any security system including the side air-back that is intended for deployment in consequence of detection of impacts from a direction that is non-parallel to a longitudinal axis of the host vehicle.

The invention allows the activation of a security system in the vehicle by a security signal that is generated by a software module connected to the video sensor. The security signal is activated in two principle situations: the vehicle is approach by a dangerous object or the vehicle itself approaches another object for example a vehicle stats skidding on a rain wet road.

The use of a video sensor allows deriving objects from full frame information by comparison with objects stored for example in internal tables for object recognition or in a better process to detect object features and classify them.

The security system includes a sensor that is mounted outside the vehicle in a rear view mirror. For this position is another few centimeter from the passenger's compartment the pre-crash time period increases and allows a higher level of security for the passenger.

The security system with a video sensor in the rear view mirror is preferably a stand alone solution.

The combination of other sensor signals and the signals of the side impact sensor allows a better decision scheme whether to activate the air back or not.

DETAILED DESCRIPTION OF THE DRAWINGS

Figure 1:
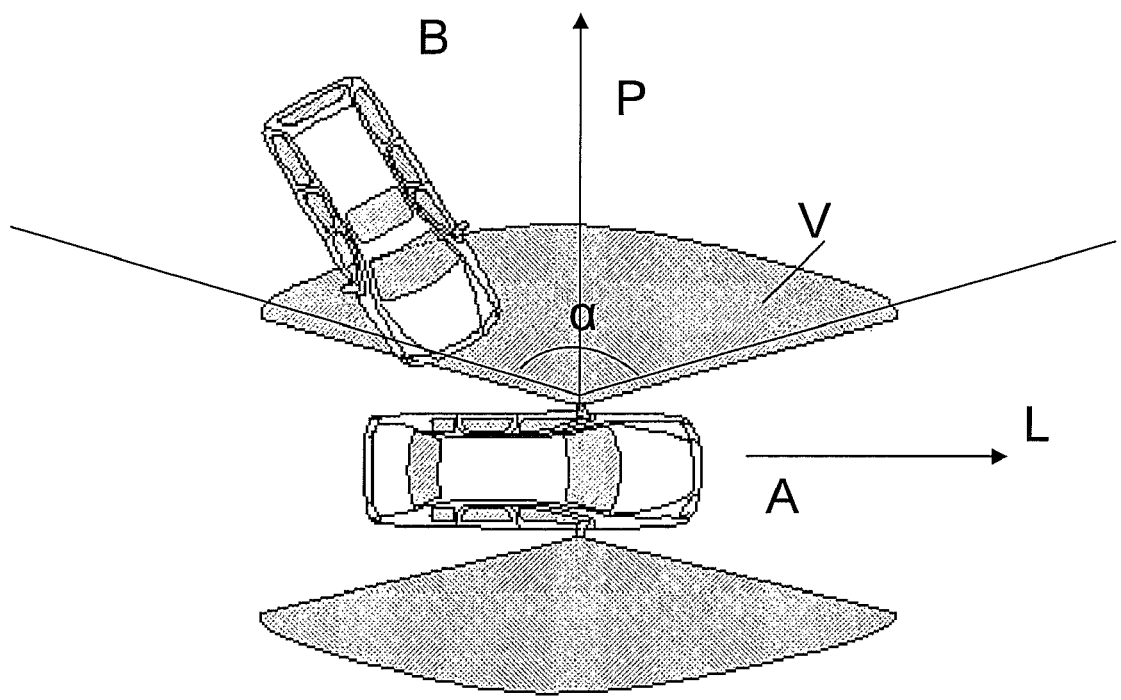
FIG. 1 shows a traffic situation with a potential dangerous situation

FIG. 1 shows a traffic situation in which a vehicle A is travelling along a direction L. The view of the security system of the vehicle is shown as two grey areas beside the vehicle. The view has an opening more than plus/minus 75 degrees from the axis P perpendicular to the longitudinal axis L of the vehicle. The complete opening of the view alpha is between 150 to 180 degrees.

A vehicle B approaching from the rear side of the vehicle A is detected in the view area.

Figure 2:
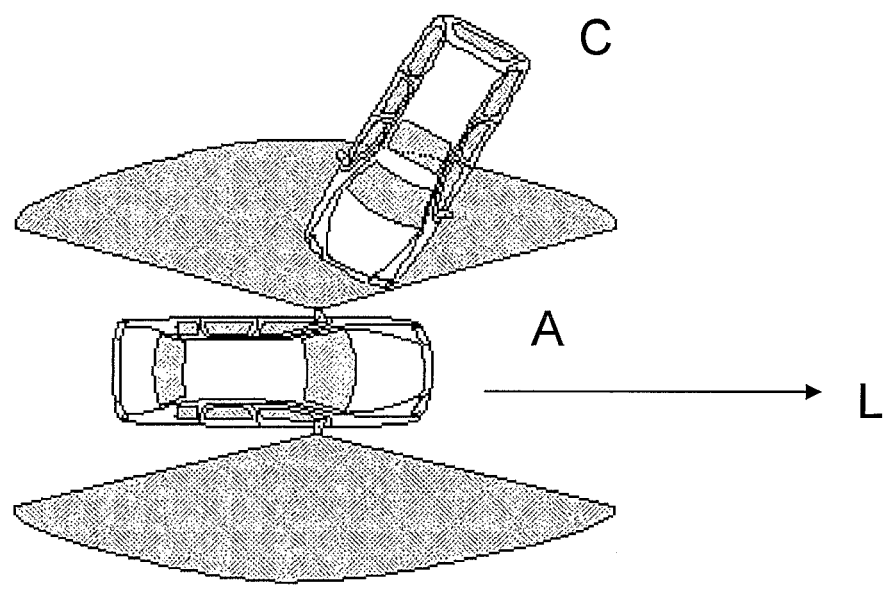
FIG. 2 show an alternative traffic situation

In FIG. 2 a similar traffic situation is shown with a vehicle C approaching from the front side of vehicle A. The potential impact of the vehicles approaching vehicle A is detected in the area of view V. The situation can be also interpreted that vehicle A could skid in direction to vehicle B or C and approach the approaching or standing other vehicles.

Figure 3:
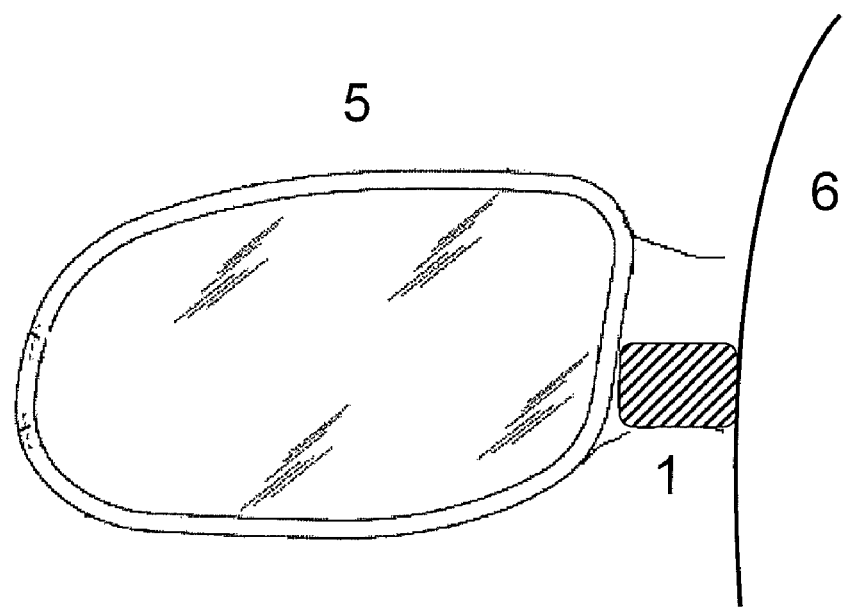
FIG. 3 is an embodiment of a rear view mirror design

To establish this view V a camera sensor is attached or integrated in the vehicle A. FIG. 3 shows schematic the position of the camera sensor 1 in rear view mirror 5 who is attached to a vehicle 6. The position of the camera sensor is in the mirror bracket of the rear view mirror a position in which the camera is not moved when a power fold feature folds the mirror in a parking position. This position is a secure position for the camera also protected against accidents, when the mirror is broken off. From passenger's position the camera is around 10 centimeter farer away than the known pre crash sensor in the vehicle door. These few centimeters are enough to win time for a decision to explode air back or not.

Figure 4:
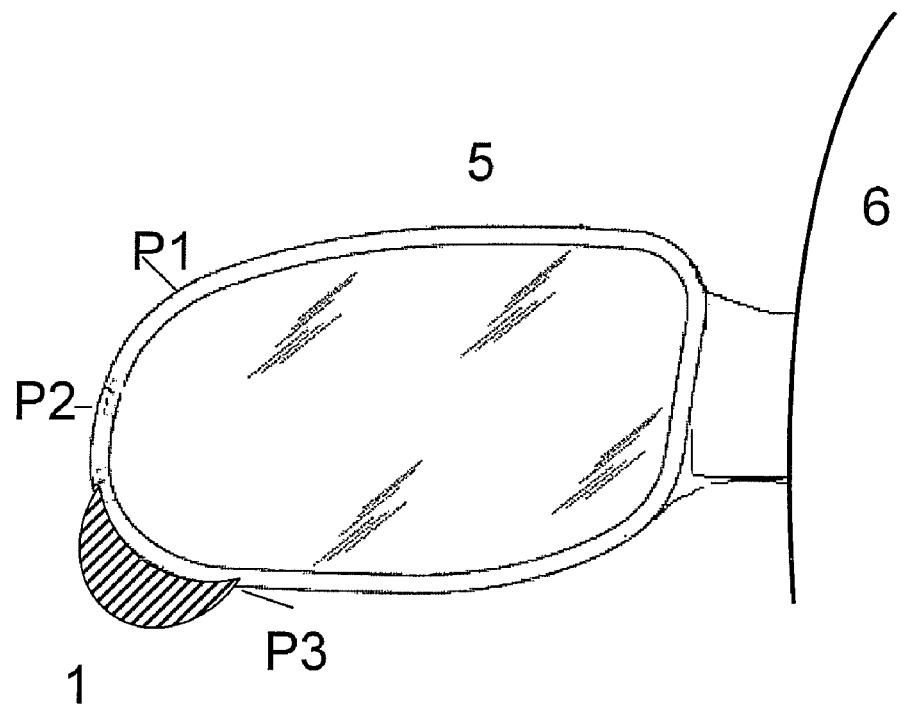
FIG. 4 is an alternative rear view mirror design

FIG. 4 shows another embodiment of the camera in a rear view mirror. The camera 1 is positioned at the end of the mirror 5 remote from the vehicle 6. The position of the camera is shown as an example below the reflecting surface of the mirror. But the camera can also implemented at positions P1, P2 or P3 attached to the mirror housing or integrated into the mirror housing.

Using the position remote from the vehicle additional 15 to 20 centimeters could be added in comparison to a pre crash sensor positioned in the vehicle door.

Figure 5:
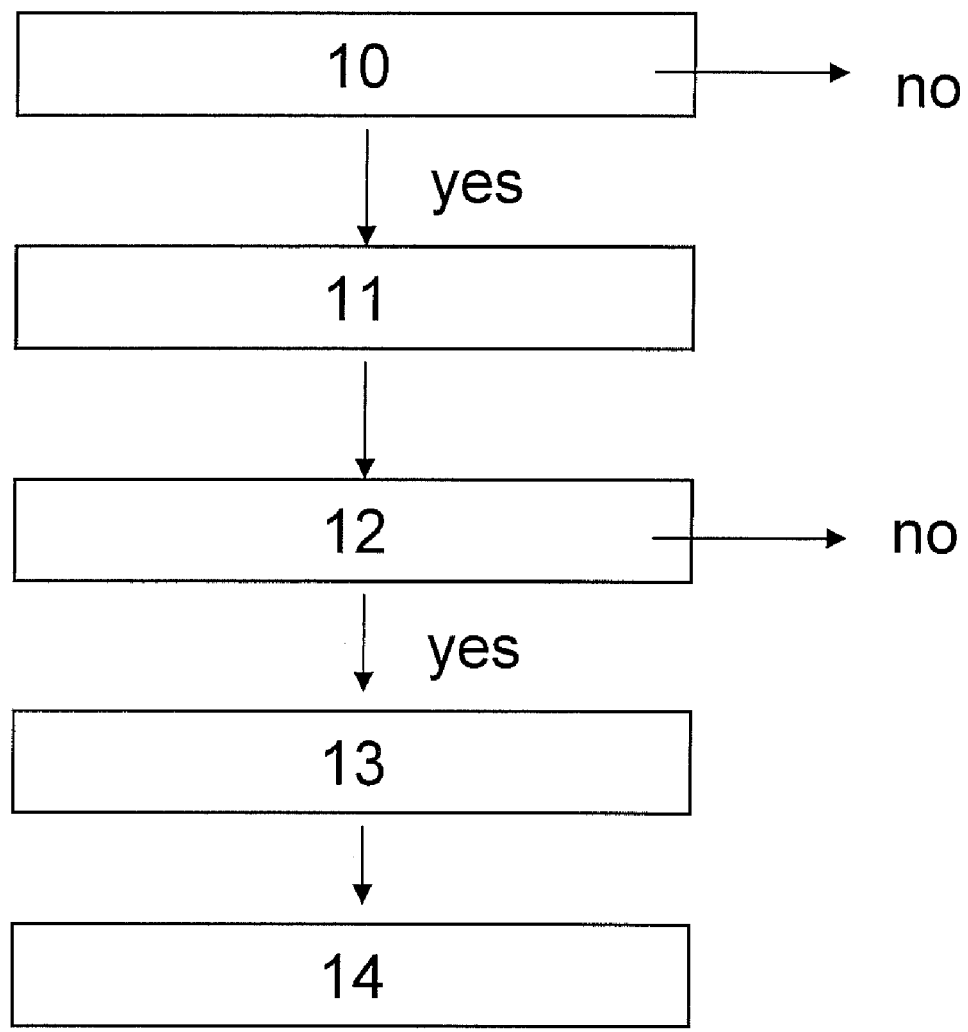
FIG. 5 is a schematic diagram of a first method

The process to derive a security signal is explained in a schematic way in FIG. 5. In step 10 the object which is entering into the view area V is detected. In this step the object is also recognized. This is done by an algorithm known in prior art, using an edge filter to filter out shapes. The advantage of the use of a camera sensor is that the object is defined in this early stage of approaching. This definition of the object is not only possible with edged filter that are also known from radar sensing but by object is defined by some of its features as a wheel, as a head light etc. It is clear whether it is a pedestrian or a ball or a vehicle. This means that in this first step of object recognition all objects that are without danger for the vehicle are pre-selected and will not be tracked in the danger classification. This reduces the number of events that must be checked in the danger classification afterwards. In step 11 the object is followed to derive the parameters of approach velocity and vector. The objects that are defined as uncritical will not be tracked into the danger classification any more. The step of tracking will mainly be applied on vehicles entering into the security zone. This is the normal traffic situation in which the security system has to decide about actuating a security signal or not.

In step 12 the danger is classified. This means that the objects that are still tracked and the tracking parameter as velocity, vector of approach and size of the objects are qualified to get a decision about the security signal. If velocity, size and vector of the approaching object—this means normally a vehicle—is increasing over a predefined threshold the security signals is generated in step 13 as an alert signal to the vehicle safety system. In step 14 the safety system is activated, for example the side air-back explode.

The system is a two step danger qualification system. The optical recognition method allows selecting only the approaching objects that are dangerous. It is not necessary to follow for example a ball entering into the view area because the definition of "ball" deletes this object from the list of dangerous objects.

The second danger qualification step is than active when velocity and vector of an approaching vehicle is defined to be a danger.

The two step danger qualification system reduces the calculating power of the receiving sensor, and reduces the number of quasi-accidents and the risk to have a fault alarm.

The camera sensor is working with a frame clock rate of 60 up to 240 frames per second. The frame clock rate depends on the area that must be overviewed and the light conditions. With this frame rates the reliable detection of objects the velocities and vectors are achieved.

In one alternative embodiment the frame rate is increase when the first level—the object recognition—detects a dangerous object. This application could be of interest to save electrical energy in the security system.

In another embodiment of the invention the video sensor is used in a slightly different way. The whole area of the video pixels is normally used to derive the picture of vehicle's surrounding. Let assume that three objects are approaching the vehicle with different velocities and angles. The video sensor is detecting all three objects and classifies them into one dangerous and two not important objects. The video sensor is than controlled in away that the sensor area is working like a zoom function on the dangerous object that is approaching. The other objects are fading out. With the decision in the first level that one of the objects is a potential dangerous object the tracking function is handled by a processor with a higher resolution and capability. This means that in step 11 of the method the processor is changed to another type with better performance. This has the advantage that the time scale is optimized. The whole decision process must be very fast to allow the generation of the security signal in time before the impact. To rely in normal condition on a processor with a moderate performance and to switch in case of emergency to a processor with higher performance is a resource efficient way to run the process.

Figure 6:
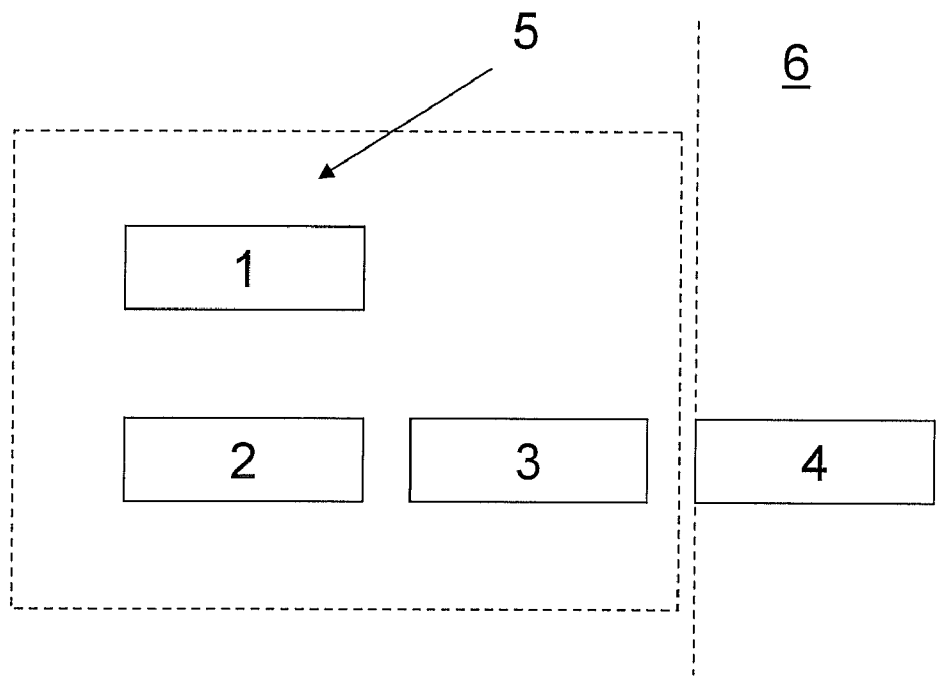
FIG. 6 scheme of the system
Figure 7:
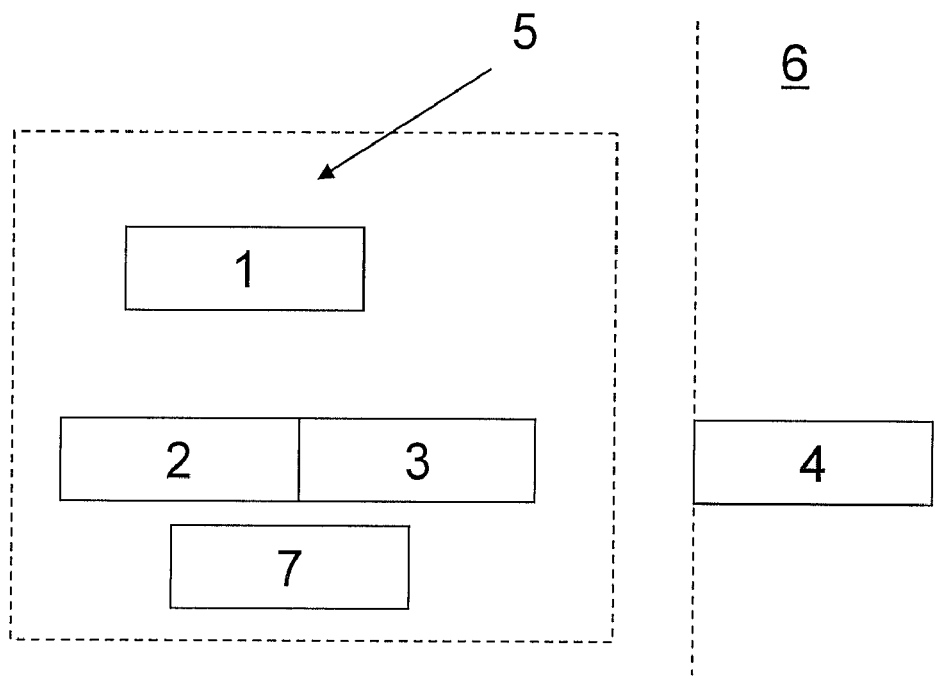
FIG. 7 alternative scheme

In FIG. 6 a structure of the security system is shown. The part marked by the dashed line is the part of the system located in the rear view mirror. The sensor 1 is therein connected to a controller 2 and this controller is linked to a software module 3. The connection is than completed to a communication and control system 4 in the vehicle. This structure can be modified by a person skilled in the art. For sure the combination of software module 3 and controller 2 in one device is an option as shown in FIG. 7. it is also possible to implement the controller and the software module in the vehicle and to connect the sensor. The storage mean 7 can be separate from the controller or part of it as the software module.

The software module is described as a device, in normal implementation the software will be a part of the controller function running on the controller.

The controller 2 in the figures is in one embodiment replaced by two controllers with different performance.

Figure 8:
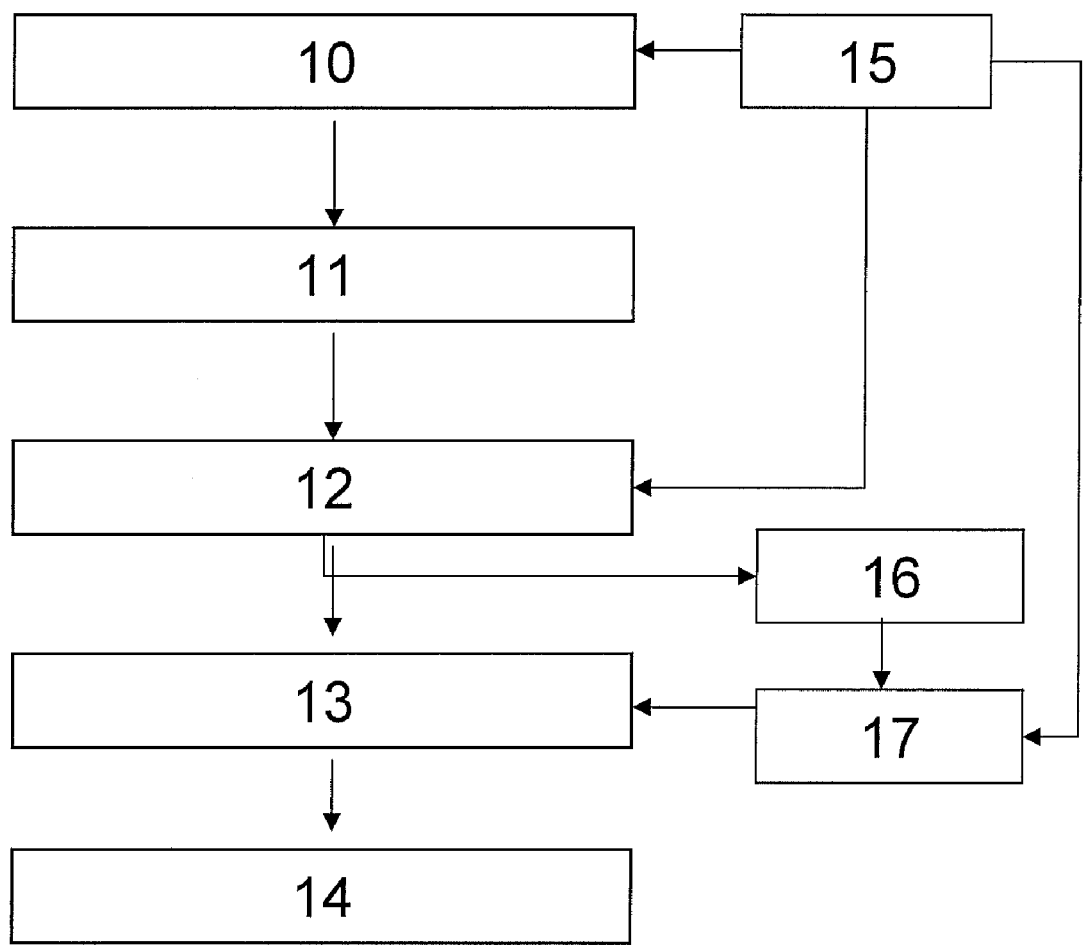
FIG. 8 Schematic diagram of a second method

In FIG. 8 additional steps are added to improve the method of FIG. 5. This improved method integrates other sensor function to improve the decision process and to avoid fault alarm.

Step 15 includes a data input form another than the video sensor. The additional data are used in the first level of object recognition to select the dangerous objects. The data input of 15 are also used in the second danger classification level 12. Via an output of the classification date to other sensor system in step 16 a common decision 17 about the activation of security signal is done.

The improved method can for example use the data input of an additional radar sensor or an additional optical sensor.

The physical connection of the sensors and controllers is realized in data bus technology as the CAN bus in a vehicle. The security signal that is generated in step 13 can be used in the whole vehicle to protect passengers.

One additional function is described without a further figure. In FIG. 5 the step 12 represents the danger classification level two. When this classification decides a "yes" the security signal is activated. In this stage the video stream of the received video signal is stored in a storing mean to perceive evidence if an accident occurs. The video stream is stored frame by frame up to the capacity of the storing mean and in a method first in first out the frames are overwritten with the actual frames. The overwriting is stopped after a pre-defined time period in the case the security signal is activated. This video information that can be read out save the pictures for an after accident analysis.

The invention claimed is:

1. Security system for a motor vehicle having a side and a vehicle electric and communication system, said security system comprising:

a video sensor fixedly secured to the side of the motor vehicle, said video sensor having a field of view ±75° from an axis perpendicular to the side of the motor vehicle and creating a video signal; and a controller electrically connected to said video sensor for receiving said video signal for video frame analysis, said controller having a software module to run software using a multilevel optical object recognition mode and a connector to the vehicle electric and communication system, said software module providing a security signal to be transmitted out of said controller to the vehicle electric and communication system when a side impact is measured to be imminent, said multilevel optical object recognition mode identifying objects in the video signal on one level of optical recognition and, in a subsequent level, identifying direction and speed of the objects in the video signal identified in said one level of optical recognition.

2. Security system according claim 1 installed in a rear view mirror wherein the video sensor for side impact sensing is positioned in an exterior rear view mirror.

3. Security system according claim 1 installed in a rear view mirror wherein the video sensor for side impact sensing is including a storage device.

4. Security system according claim 2 installed in a rear view mirror wherein the video sensor is positioned at the remote end of the rear view mirror.

5. Security system according claim 1 installed in a rear view mirror wherein said controller and said software module are positioned in the rear view mirror.

6. Method to derive a security signal for a motor vehicle having a vehicle side with the following steps:

receiving a video signal via a video sensor, having a view of at least ±75° from the axis perpendicular to the vehicle side;

analyzing the video signals;

defining objects by object recognition in a first decision level;

comparing the objects in successive video frames of said video signal to define velocity and direction of the object with respect to the motor vehicle;

classifying the objects using the velocity and direction parameters of the previous step in a second decision level; and providing a security signal in case of expected side impact for use in a vehicle safety system of the motor vehicle.

7. Method according claim 6 further including the step of using the security signal as a trigger for exploding a side air bag.

8. Method according claim 6 further including the step of using further sensing signals to verify the danger situation and to improve the decision by further parameter sets.

9. Method according claim 6 wherein the video signal is stored in a storage device.

* * * * *